United States Patent [19]

Fico et al.

[11] 3,748,450

[45] July 24, 1973

[54] NUMERICAL BASE TRANSLATOR

[75] Inventors: Louis Fico; Roger N. Sheker; Raymond J. Ballou; David C. Cosman, all of Rochester, N.Y.

[73] Assignee: Comtec Industries, Inc., Rochester, N.Y.

[22] Filed: Oct. 18, 1971

[21] Appl. No.: 189,964

Related U.S. Application Data

[63] Continuation of Ser. No. 874,859, Nov. 7, 1969, abandoned.

[52] U.S. Cl.......... 235/155, 340/347 DD, 340/172.5

[51] Int. Cl............................................. H03k 13/24

[58] Field of Search............................ 235/154, 155; 340/347, 172.5, 365; 35/31, 9 A

[56] References Cited

UNITED STATES PATENTS

| | | | |
|---|---|---|---|
| 3,064,889 | 11/1962 | Hupp | 235/155 |
| 3,276,013 | 9/1966 | Chandler | 235/155 X |
| 3,521,040 | 7/1970 | Frentress | 340/347 X |
| 3,111,648 | 11/1963 | Marsh et al. | 235/155 X |
| 3,162,960 | 12/1964 | Elmlinger | 235/155 X |
| 3,376,550 | 4/1968 | Mei-Goon Wong et al. | 235/155 X |
| 3,350,708 | 10/1967 | Adler | 235/155 X |
| 3,257,547 | 6/1966 | Bernstein | 235/155 |

*Primary Examiner*—Charles D. Miller
*Attorney*—Shlesinger, Fitzsimmons & Shlesinger

[57] ABSTRACT

This translator is capable of receiving and automatically displaying most significant digit first, a number to any numerical base or radix; and it may then convert the number to another base and display the converted number, or it may store the number for use in an arithmetic operation. The translator keyboard includes a plurality of radix keys, and before a number is entered, its corresponding radix key is pushed to route the input data (number) to one of a plurality of holding registers, and simultaneously to a display register. When a number has been entered, it may be converted to another base and displayed, merely by pushing a different radix key. Alternatively the number can be stored by pushing a storage key, after which a second number is entered and an arithmetic unit may be operated to add, subtract, multiply or divide the two numbers.

20 Claims, 9 Drawing Figures

INVENTORS
LOUIS FICO
ROGER N. SHEKER
RAYMOND J. BALLOU
DAVID C. COSMAN
BY
Shlesinger, Fitzsimmons & Shlesinger
ATTORNEYS

INVENTORS
LOUIS FICO
ROGER N. SHEKER
RAYMOND J. BALLOU
DAVID C. COSMAN

BY Shlesinger, Fitzsimmons & Shlesinger
ATTORNEYS

INVENTORS
LOUIS FICO
ROGER N. SHEKER
RAYMOND J. BALLOU
DAVID C. COSMAN

BY

Shlesinger, Fitzsimmons & Shlesinger
ATTORNEYS

INVENTORS
LOUIS FICO
ROGER N. SHEKER
RAYMOND J. BALLOU
DAVID C. COSMAN

BY

Shlesinger, Fitzsimmons & Shlesinger
ATTORNEYS

INVENTORS
LOUIS FICO
ROGER N. SHEKER
RAYMOND J. BALLOU
DAVID C. COSMAN
BY
Shlesinger, Fitzsimmons & Shlesinger
ATTORNEYS FIG. 2
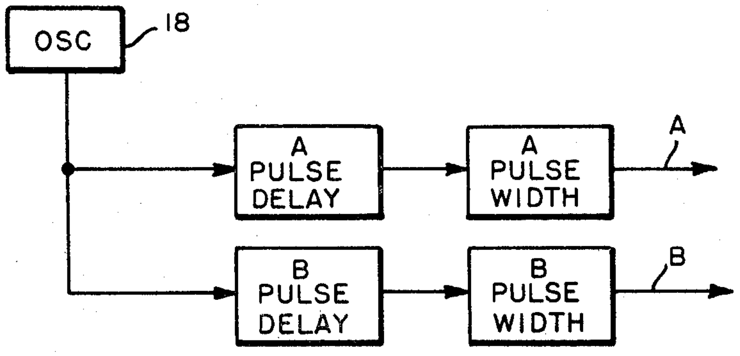
FIG. 3
| | |
|---|---|
| BINARY | 1 0 1 1 0 0 1 1 0 0 1 1 0 0 1 1 |
| OCTAL | 1  0 1 1  0 0 1  1 0 0  1 1 0  0 1 1 |
| HEXIDECIMAL | 1 0 1 1  0 0 1 1  0 0 1 1  0 0 1 1 |
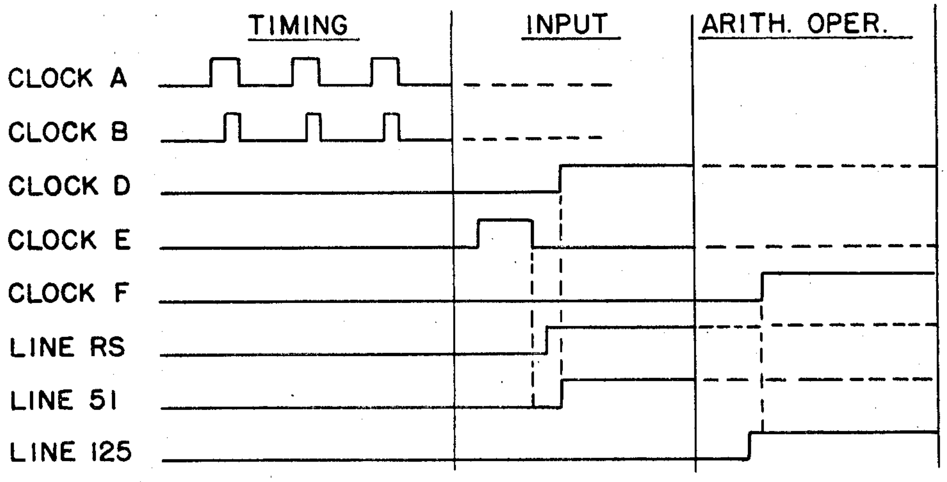
FIG. 4
INVENTORS
LOUIS FICO
ROGER N. SHEKER
RAYMOND J. BALLOU
DAVID C. COSMAN
BY Shlesinger, Fitzsimmons & Shlesinger
ATTORNEYS INVENTORS.
LOUIS FICO
ROGER N. SHEKER
RAYMOND J. BALLOU
DAVID C. COSMAN
BY
Shlesinger, Fitzsimmons & Shlesinger
ATTORNEYS

NUMERICAL BASE TRANSLATOR

This is a continuation of application Ser. No. 874,859, filed Nov. 7, 1969 now abandoned.

This invention relates to computers, and more particularly to apparatus capable of accepting and displaying numerical input data to any one of a plurality of different numerical bases or radices, and then converting and displaying that data, to data based on another radix. More particularly this apparatus is capable of accepting inputs to any preselected numerical base, and by proper selection may add, subtract, multiply or divide the inputs and display the results, or convert and display the results to any selected numerical base.

The present day computer is set up to have information addressed to, and retrieved from, the computer in its unique base number. No present day computer hardware operates in more than one numerical base. One manufacturer, for instance, may design a computer for use with input data based on the hexidecimal system, while another manufacturer may design computers that are set to utilize the octal system. If a chart of decimal numerals, for example, is set into one of these two different types of computers, the numerals will be stored, and can be displayed, in hexidecimal characters in the case of the first-mentioned computer, and in octal characters in the case of the second-described computer. To convert the output of these units back to decimal form, charts or mathematical forms can be used; or the individual machine can be programmed to perform this conversion. However, during the program debug stage the computer is not used for making the necessary conversions that the programmer must make to solve program problems or to prove certain program calculations. Since the computer is in use with the unproven program, the programmer must make address changes, calculations and conversions manually in the computers arithmetic base language. Hence the need for a unique apparatus that can be used in conjunction with present computers, and which is totally compatable with whichever airthmetic base language the manufactuere may use.

In either of the above-described cases, much time and possible operator error is involved in converting the result or output data of a computer from one numerical base to another.

It is an object of this invention to provide apparatus which is compatible with the arithmetic base of any computer, which can accept input data based on any radix, and which is capable of converting and displaying the data in characters having another radix value.

Another object of this invention is to provide an improved computer which can accept input data having any radix, and which can perform an airthmetic computation with the data and then display the results in characters based on any other selected radix or base.

Other objects of the invention will be apparent hereinafter from the specification and from the recital of the appended claims, particularly when read in conjunction with the accompanying drawings:

In the drawings:

FIGS. 1A to 1E taken together constitute a schematic wiring diagram illustrating one manner in which a computer of the type described may be wired to translate input data from one numerical base to another in accordance with one embodiment of this invention;

FIG. 2 is a schematic wiring diagram of two clock signal sources employed in conjunction with the circuitry shown in FIG. 1;

FIG. 3 is a diagram illustrating the similarity between binary representations of data in binary, octal and hexidecimal form, respectively;

FIG. 4 illustrates wave forms of clock pulses and signal potentials at different locations in the control circuitry of this invention.

Figure 1A:
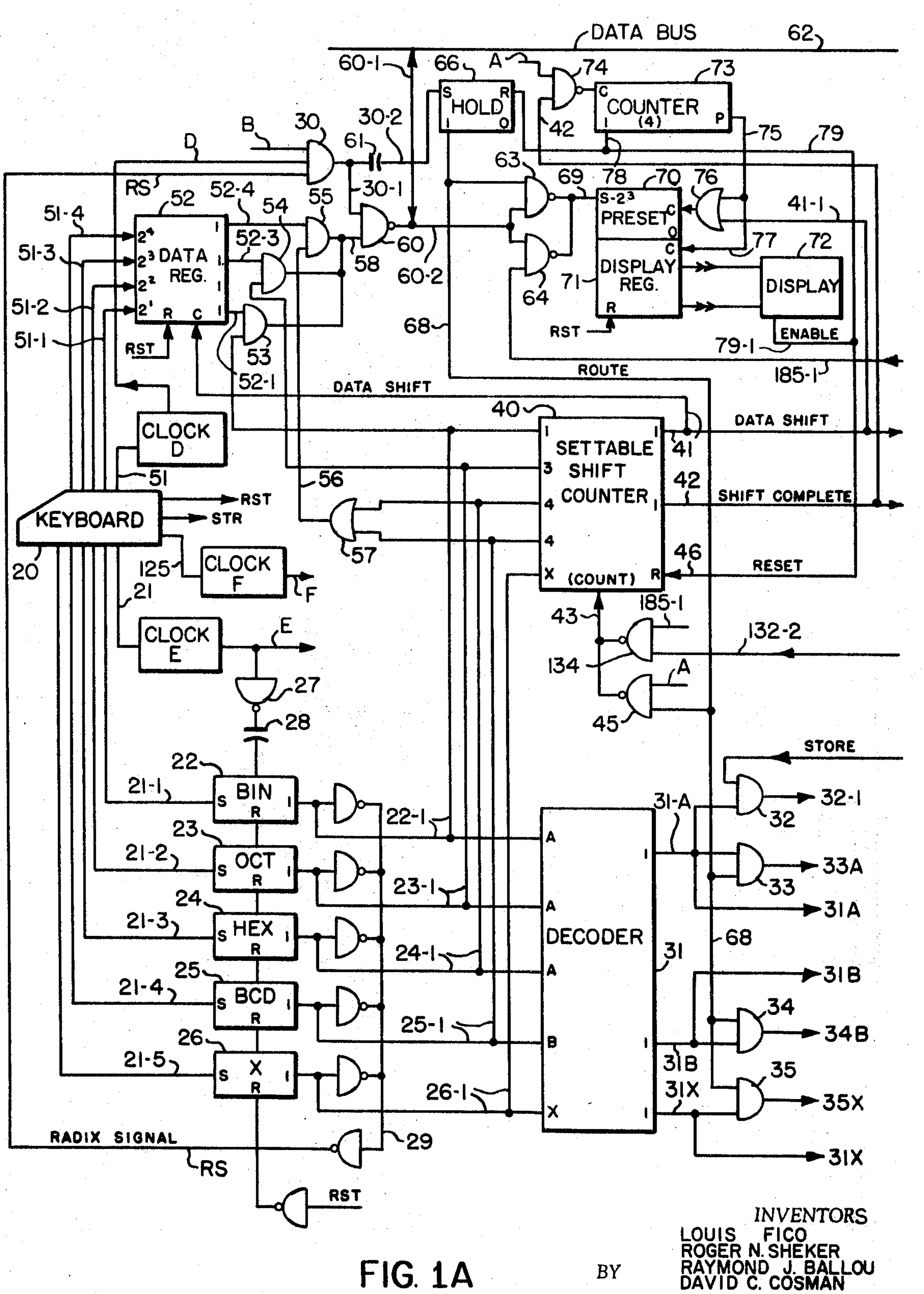

Referring now to the drawings by numerals of reference, and first to FIGS. 1A and 2, 20 denotes a standard keyboard having a plurality of manually operable keys (not illustrated), including the usual data keys, and at least five radix or base selecting keys, which are operable selectively to cause the input data to be entered and displayed either in binary, octal, hexidecimal, binary coded decimal (BCD) or some other (X) form. For necessary timing and control purposes two clock signals A and B (FIG. 2) are developed from a conventional crystal controlled oscillator 18, and by separate delay and width determining units as shown in FIG. 2, to give the desired clock outputs shown in FIG. 4.

The five radix selecting keys on keyboard 20 are coded to set one of five radix indicating registers 22 (binary), 23 (octal), 24 (hexidecimal), 25 (BCD) and 26 (X), when a signal is received from the output of the keyboard on lines 21-1, 21-2, 21-3, 21-4 and 21-5, respectively. The operation of any radix key on the keyboard 20 also causes an output signal on line 21 momentarily to energize a clock E, which generates momentarily an output pulse or signal E. The leading edge of the output signal of clock E is connected through a NAND gate 27 and a capacitor 28 to the registers 22 to 26 to reset these registers before one of them is set by an incoming signal on one of the lines 21-1 to 21-5.

The registers 22 to 26, as well as other registers described hereinafter, may be reset in unison at any time by pushing a reset button (not illustrated) on the keyboard 20, thus producing an output signal RST for this purpose.

The outputs of the radix registers 22, 23, 24, 25 and 26 are connected separately through five different NAND gates with a common line 29, which is applied to the input of a NAND gate having a radix signal output line RS. Line RS is connected to the input of an AND gate 30, so as partially to enable this gate whenever a radix signal appears on line RS. The outputs of registers 22, 23, 24, 25 and 26 are connected also through lines 22-1, 23-1, 24-1, 25-1 and 26-1, respectively, to five different input terminals of an address decoder 31, and also to five different input terminals of a settable shift counter 40.

When a signal is applied by any one of the lines 22-1, 23-1, and 24-1 to any of the three input terminals A of the decoder 31, a signal appears on the decoder output line 31A, thus partially enabling two AND gates 32 and 33. The same signal on line 22-1, 23-1 or 24-1 is also applied to one of the input terminals designated 1, 3 or 4 on the shift counter 40, thus setting the counter to produce, when enabled, either one, three or four pulsed output signals on its output or data shift line 41. Similarly, when a signal appears on the line 25-1 from the output of the BCD register 25, it is applied simultaneously to the input terminal B of the decoder 40, and to a further terminal 4 on the counter 40, thus producing a signal on the decoder output line 31B partially to gate an AND gate 34, and setting the counter 40 to produce four pulsed output signals on line 41, when enabled. In the same manner, when a signal appears on line 26-1, and hence at the X input terminals of the decoder 31 and the counter 40, it will produce an output signal on line 31X partially to gate an AND gate 35; and it also will set counter 40 to produce, when enabled, a predetermined number (X) of pulsed output signals on its line 41, depending upon the number of bits required to represent a digit in the selected radix X.

The shift counter 40 is triggered or enabled by the appearance of a signal on line 43; and when the counter has counted out, or produced the number of pulsed output signals for which it was previously set, a shift complete signal appears on its output line 42. Also, counter 40, after counting out, can be reset by the appearance of a reset signal on line 46.

The keyboard 20 is also provided with a plurality of data keys (not illustrated) which may be operated, after the correct radix has been entered, to enter data in the usual manner, most significant digit first. However, the logic will assume the binary radix, if no other radix has been selected. When a data key is pressed, the keyboard converts the corresponding digit into its binary equivalent, and enters this information into a data register 52 through the parallel keyboard output lines 51-1, 51-2, 51-3 and 51-4. The operation of a data key also energizes a clock D through line 51 to produce a momentary clock signal D, which is also applied to the input of gate 30.

If the data being entered is in binary form, as represented by a zero or a 1, this information will be applied as a single data bit (zero or one) through line 51-1 to the terminal $2^1$ of the data register 52. If the input data is to the octal base, each digit will be represented by three data bits or signals applied through lines 51-1, 51-2 and 51-3 to terminals $2^1$, $2^2$ and $2^3$ of the data register. If the input data is in hexidecimal or decimal form, at least four data bits or signals on lines 51-1 to 51-4, respectively, will be applied to all four input terminals of the data register 52 for each digit entered on the keyboard.

The information which is entered into data register 52 is transmitted serially out of the register on one of three output lines 52-1, 52-3 or 52-4, corresponding, respectively, to a one bit input to the register, a three bit input, or a four bit input. Lines 52-1, 52-3 and 52-4 provide one of two inputs to each of three AND gates 53, 54 and 55, respectively. The other input to gate 55 is the output line 56 of an OR gate 57 having two inputs connected, respectively, to the lines 24-1 and 25-1, so that gate 57 is gated or enabled whenever a hexidecimal or BCD radix has been selected. The other input to the gate 54 is connected to line 23-1 to receive the signal from the output of the octal radix register 23; and the other input to the gate 53 is connected to line 22-1, and hence to the output of the binary radix register 22.

The outputs of the gates 53, 54 and 55 are connected to a common line 58, which provides one of two inputs to an AND gate 60, which ultimately gates the output of the data register 52. Gate 60 has a second input line 30-1 connected to the output of the AND gate 30, which is enabled by signals from the radix signal line RS, and clocks D and B. The output of the gate 30 is also connected through a capacitor 61 and line 30-2 to the set input of a holding flip flop 66 to produce a routing output signal on a line 68, which is connected to one of two inputs to each of two AND gates 63 and 45, and which also is connected to the inputs of the gates 33, 34 and 35 to provide the second of two enabling signals therefor. The output of clock A forms the other enabling signal or input for the gate 45, which, when enabled, triggers the counter 40.

The output line 60-2 of the gate 60 is connected by a line 60-1 to a data buss 62, and is also connected to the other input of gate 63, and to one of two inputs of AND gate 64. The outputs of the gates 63 and 64 are connected by line 69 to the input of a four bit preset register 70, which has its output serially connected to a display register 71. The preset register 70 is shifted one bit each time a signal appears on the data shift line 41 at the output of the shift counter 40. This is effected by a line 41-1, which connects line 41 to the input of an OR gate 76, the output of which is connected to the shift enabling terminal of the preset 70, so that whenever a signal appears on line 41, the preset 70 is shifted one bit to prepare it for receiving a new data signal on line 69. In other words, as the data signals representing the stored digit in data register 52 are shifted serially out onto line 60-2 upon the enabling of the shift counter 40, they are simultaneously shifted serially into the preset register 70 from line 69. Depending on the type of data that was entered in register 52 (i.e., one significant bit for binary, three significant bits for octal, and four significant bits for BCD or hexidecimal), the present register 70 will have received, most significant bit first, either one, three or four data bits each time the counter 40 counts out. If it received a single significant bit representing a binary zero or one, the remaining three, unused bits in the four bit preset register 70 remain zeros. If it received three significant bits representative of an octal digit entered in data register 52, the fourth, unused bit in preset 70 will remain zero.

The preset and display registers 70 and 71 are also adapted to be shifted in unison, and in groups of four bits, by a four pulse counter 73 having an input or enabling terminal C connected to the output of an AND gate 74, which is enabled by a clock signal A, and by a shift complete signal on line 42, each time the shift counter 40 has counted out. When the counter 73 is triggered, it produces four signals or pulses on its output line 75; and these pulses are applied simultaneously through the OR gate 76 to the shift enabling terminal of the preset 70, and through a line 77 to the shift clock terminal of the display register 71, thereby shifting the contents of the preset register 70 into the display register 71, including both its used and unused stages (bits) and operatively resetting the preset register to a zero state in preparation for receiving the next data digit or character from register 52. When the counter 73 has counted out, and hence has produced a simultaneous four bit shift in the preset and display registers 70 and 71, a signal appears at its output line 78, and through line 79, resets the hold flip flop 66, enables through line 79-1 the display unit 72, which is connected to the display register 71, and also resets the shift counter 40 through the line 46. When the flip flop 66 is reset, it removes the routing signal from line 68 until new data is entered at the keyboard once again to energize clock D and to enable gate 30.

Each time the contents of the preset register 70 is shifted into the display register 71, the unused, zero bits enter first, followed by the data signals, most significant bit first. The result is that each data digit is entered serially into the display register 71 in groups of four bits; and each such group represents the binary equivalent of the digit that was shifted from register 52, and through register 70, to register 71. Each such four bit group in the display register 71 then energizes one of a plurality of conventional, multi-segment display lamps in the display unit 72, when the enabling signal appears on line 79-1, thus providing an alpha-numeric display of the entered data.

Figure 1B:
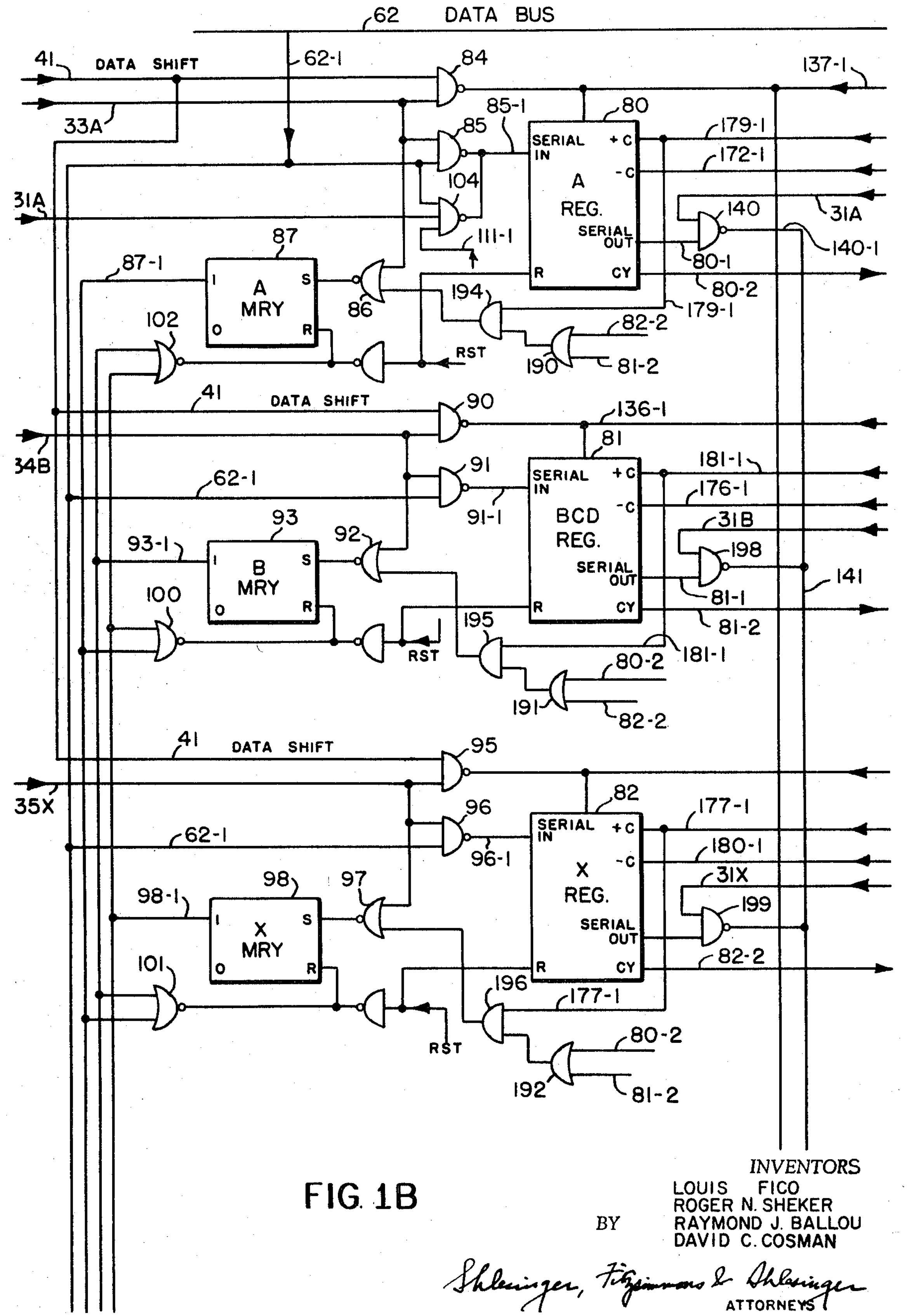

All input data that is transferred out of the data register 52 is entered substantially simultaneously in both the display register 71, and through the data buss 62 to one of three additional registers 80, 81 and 82 (FIG. 1B), designated also as the A Register, the BCD Register and the X Register, respectively. The A Register holds input data that is in either binary, octal and hexidecimal form; the BCD Register holds any decimal data entered by keyboard 20 in binary coded decimal form; and the X Register may be wired to receive input data to a radix other than two, eight, 10 or 16. For example, if the input data is in either binary, octal or hexidecimal form, a signal will appear on line 31A (FIG. 1A) at the output of the decoder 31; and at the same time on the routing line 68, thus enabling the gate 33 so that a signal appears at its output 33A. As shown in FIG. 1B, the signal on line 33A partially enables two AND gates 84 and 85, and enables a NOR gate 86 to set a memory 87 associated with the A Register 80. At this time, assuming that input data has been entered into the data register 52, these input data signals or pulses are applied to the other input of the gate 85 from the output of gate 60 and line 60-1 (FIG. 1A) to data buss 62, and then to a line 62-1 (FIG. 1B), thus enabling the gate 85, and producing output signals that are applied through line 85-1 to the serial input of the A Register.

In a similar manner, if the input data is in BCD form, a signal appears on the decoder output line 31B (FIG. 1A) at the same time that a signal appears on the routing line 68, so that the gate 34 is enabled, thus producing a signal on line 34B. This signal partially enables AND gates 90 and 91 (FIG. 1B), and fully enables a NOR gate 92, which sets a memory 93 associated with the BCD Register 81. Under these circumstances, the data signals appearing on line 62-1 sequentially enable the gate 91, so that output signals therefrom are applied by line 91-1 to the serial input of the BCD Register.

If the input data is to a base X, a signal will appear on the decoder output line 31X (FIG. 1A) at the same time that a signal appears on the routing line 68, thus enabling the gate 35 and producing a signal on line 35X. This signal partially gates or enables AND gates 95 and 96 (FIG. 1B), and fully enables a NOR gate 97 which sets a memory 98 associated with the X Register 82. The data input signals appearing on line 62-1 thus sequentially enable gate 96 to apply the incoming signals through line 96-1 to the input of the X Register.

In order to shift each register 80, 81 and 82 after each data input signal is received, each of the gates 84, 90 and 95 has its other input terminal connected to the data shift line 41 to receive pulses from the output of the shift counter 40 as the latter counts down. Also, to prevent the setting of more than one memory 87, 93 or 98 at a time, the output of the memory 87 is connected through NOR gates 100 and 101 to the reset terminals of the memories 93 and 98; the output of the memory 93 is connected to a NOR gate 102 and the NOR gate 101 to the reset terminals of the memories 87 and 98; and the output of the memory 98 is connected through the gates 100 and 102 to the reset terminals of the memories 87 and 93. Also as shown in FIG. 1B, the reset terminals of the registers 80, 81 and 82, and the memories 87, 93 and 98 are connected to a reset line RST so that they can be reset simultaneously by operation of the reset button or key on the keyboard 20. Moreover, since there are times when it is desirable to enter data into the A Register, when there is no routing signal present on line 68 to enable the gate 33A, the AND gate 104, which is enabled by an address signal on line 31A, by the absence of a hereinafter described storage signal, and by data pulses on line 62-1, has its output connected to the line 85-1 to enter data in the register 80 under certain conditions that are described below.

Figure 1C:
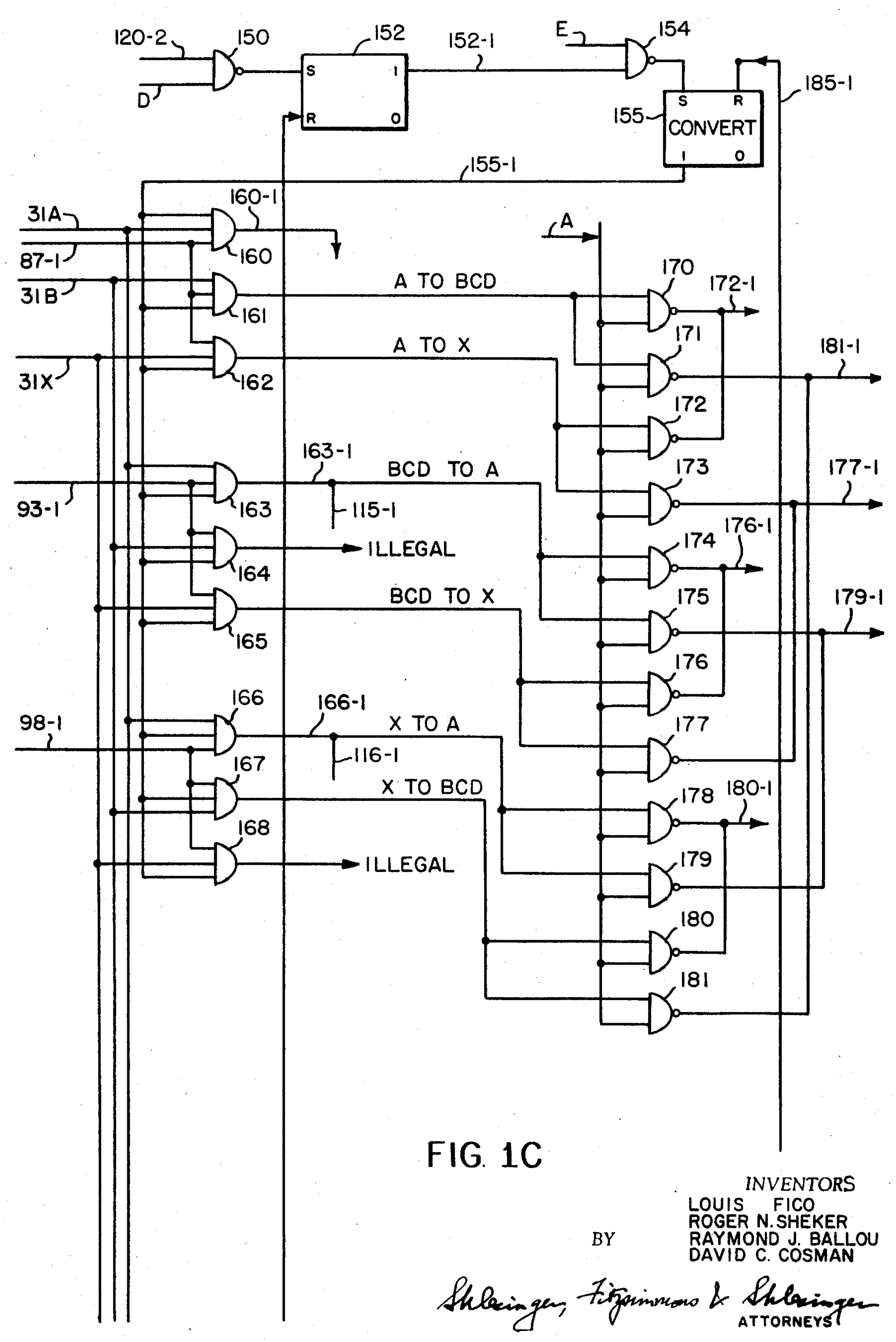
Figure 1D:
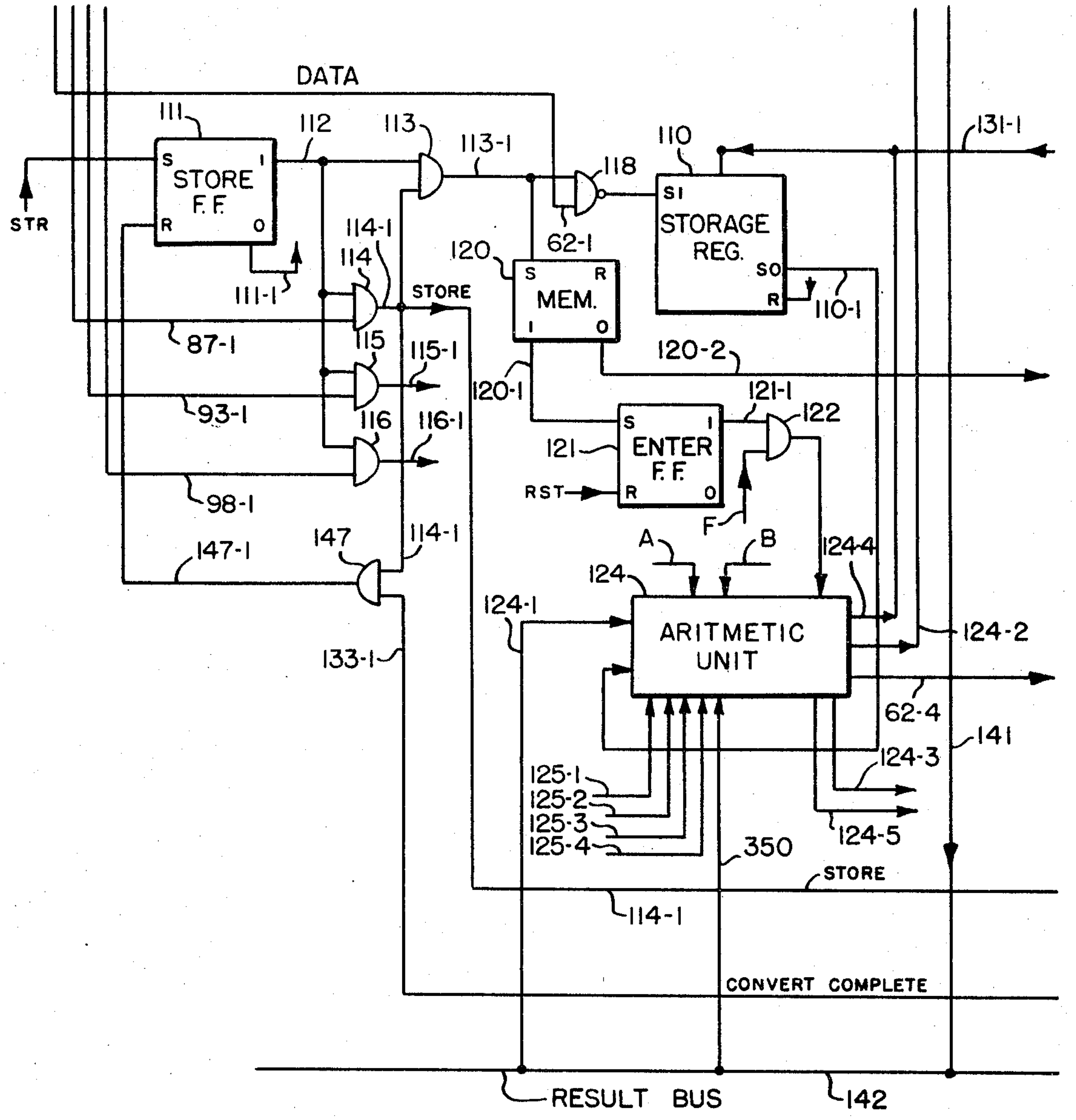

When data has been displayed and stored in one of the registers 80, 81 or 82, it may be desirable to transfer the data to a storage register 110 (FIG. 1D). Such transfer is necessary whenever the data is to be used in an arithmetic computation with subsequently entered input data, and involves the ring shifting of data from one of the registers 80, 81 or 82 to register 110. For this reason the registers must be capable of holding the same number of bits. For purposes of illustration it will be assumed that each of the registers 80, 81, 82 and 110 is a 32 bit register.

The actual transfer of data to the register 110 is initiated by depressing a storage key (not illustrated) on the keyboard 20, thus providing a signal on the storage line STR (FIG. 1D). This signal sets a store flip flop 111, and produces on its output line 112 a signal which partially enables AND gates 113, 114, 115 and 116. If the data that is to be stored is in the A Register 80, a signal appears on the A memory output line 87-1 (FIGS. 1B and 1D), thus fully enabling gate 114, and producing a signal on its output line 114-1. This signal enables gate 113 (FIG. 1D) so that a storage address signal appears on its output line 113-1, thus partially enables, an AND gate 118, the output of which is applied to the serial input of the storage register 110.

The signal on line 113-1 also sets a memory 120, which is associated with the storage register 110, and produces on the output line 120-1 of this memory a signal which sets an Enter flip flop 121. When flip flop 121 is set, a signal appears on its output line 121-1 to partially enable an AND gate 122, which controls the transmission of data to a conventional serial arithmetic unit 124. By keys (not illustrated) on the keyboard 20, this unit can be set conventionally to add, subtract, multiply or divide serially by signals received from the keyboard on lines 125-1, 125-2, 125-3 and 125-4, respectively. Whenever a key is pushed to create an arithmetic signal on one of these four lines, a signal also appears from the keyboard on line 125 (FIG. 1A) to energize a clock F, the output of which is applied to the second input terminal of the gate 122.

Before data can be transferred from the A Register 80 to the storage register 110, the data in the A Register 80 must be ring shifted serially from the A Register 80 to the data buss 62, and through line 62-1 (FIGS. 1B and 1D) to the other input of the gate 118 fully to enable the latter. For this reason, the storage signal on line 114-1 is also applied to the input of AND gate 130 and NAND gate 131 (FIG. 1E), which control the shifting signal for the A register 80 and the storage register 110. Gate 130 is pulsed by clock A producing on its output line 130-1 a series of pulses, which are applied to a line 132, which is connected to the input terminal of a thirty-two pulse counter 133. Line 132 is also connected by a line 132-1 to the other input of gate 131, and through a line 132-2 to one of the input terminals of an AND gate 134 (FIG. 1A), the output of which is connected to the count enabling line 43 for the shift counter 40. At this time, however, the other enabling signal for gate 134 is not present, so that courter 40 is not triggered.

Figure 1E:
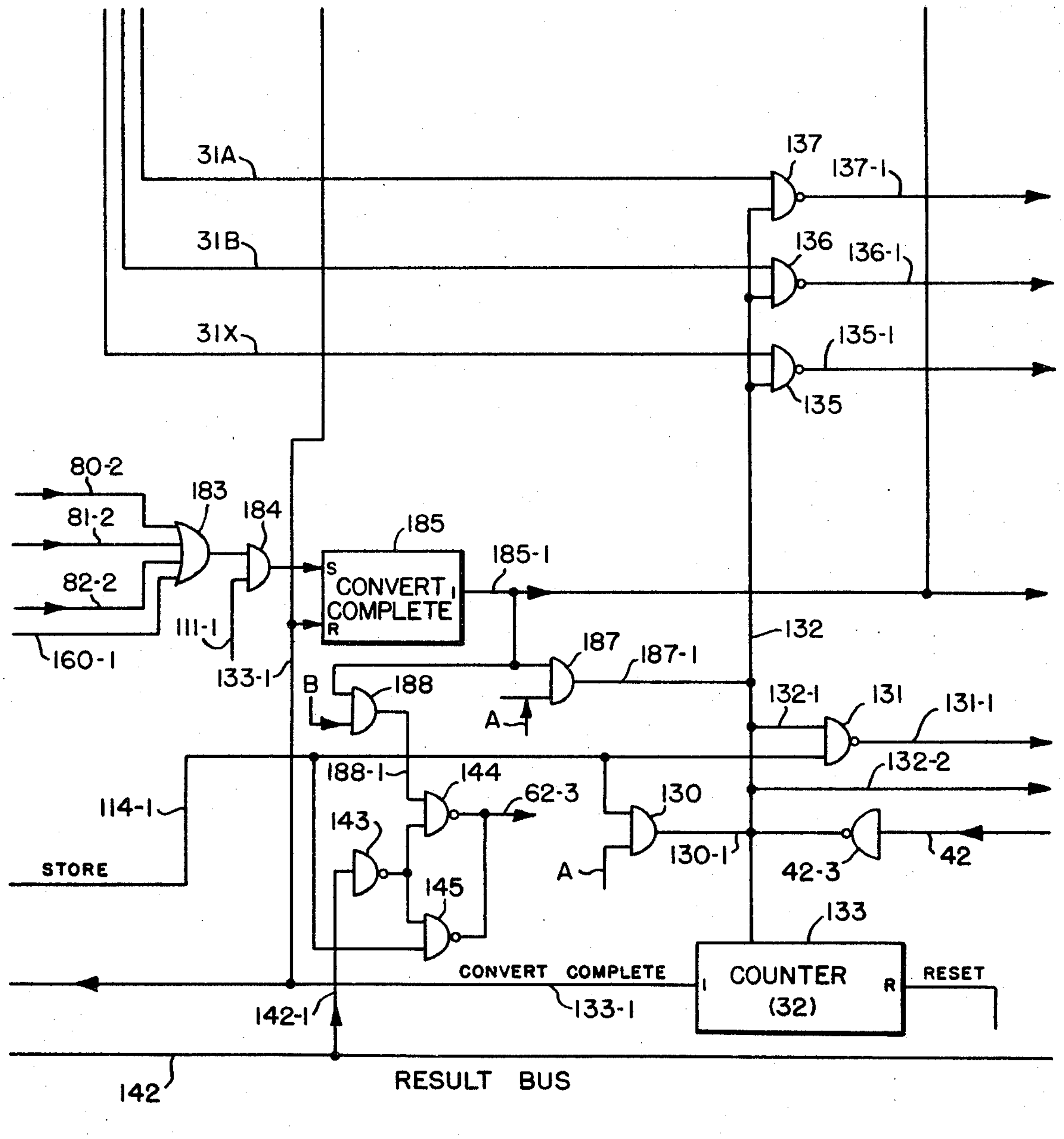
Figure 5:
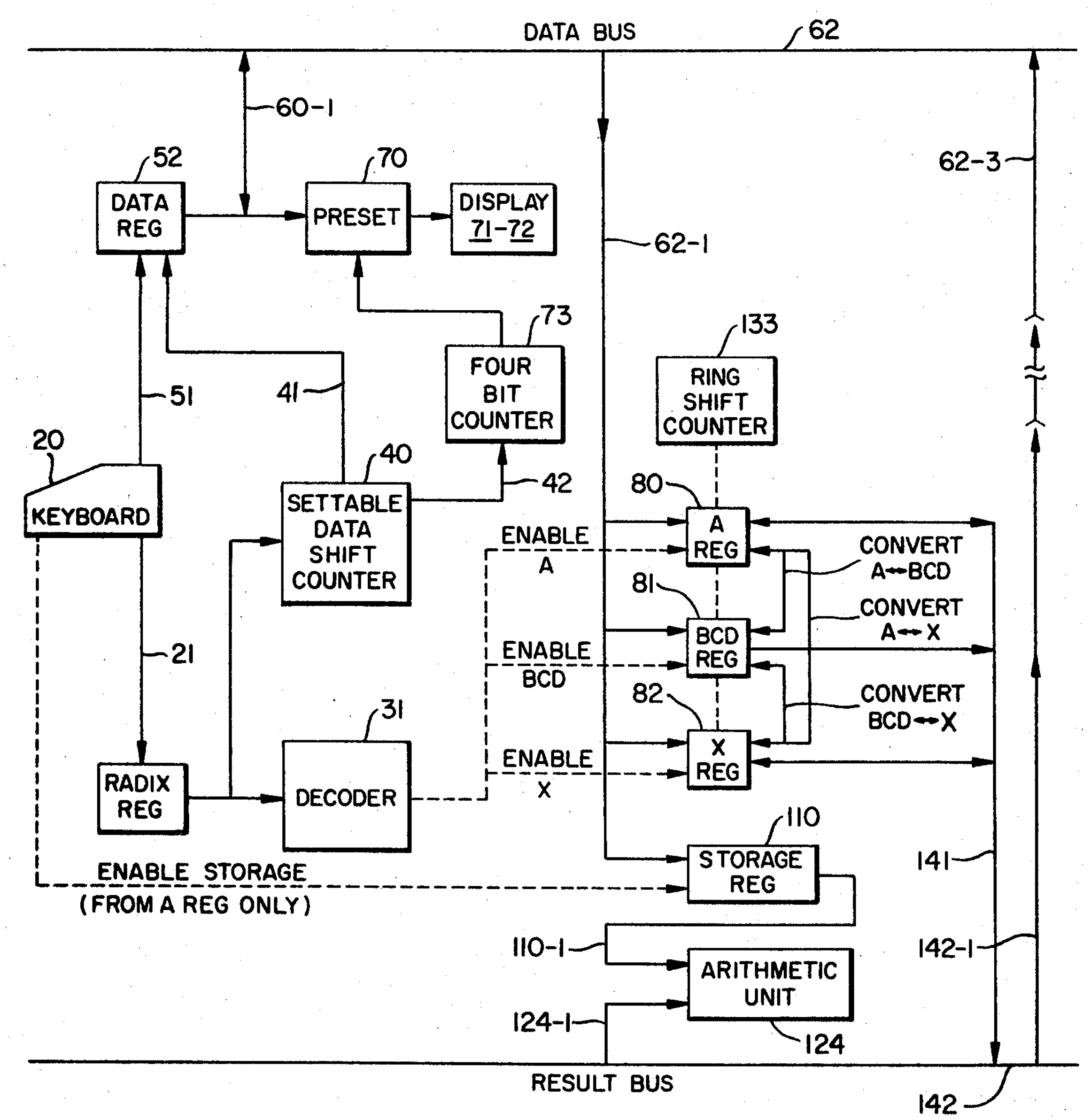
FIG. 5 is a simplified block diagram illustrating schematically the overall operation of this numerical base translator apparatus.

The signals or pulses that are applied to line 132 by clock A through the gate 130, are counted by the counter 133, and also are applied simultaneously to the inputs of three AND gates 135, 136 and 137 (FIG. 1E). The other inputs to these gates are connected to the address signal lines 31X, 31B and 31A, respectively. Since an address signal is present at this time on line 31A, the gates 131 and 137 are sequentially gated in response to the output signals of gate 130, thus producing on their output lines 131-1 and 137-1, respectively, data shifting pulses, which are applied to the shifting terminals of the storage register 110 and the A register 80, respectively (FIG. 1B). At this time the output of the register 80 is applied through line 80-1 to an AND gate 140, the other input terminal of which is connected to the address line 31A, whereby each time the A Register 80 is shifted, gate 140 is enabled and produces serial data on its output line 140-1. This line is connected by a further line 141 to a result buss 142 (FIGS. 1D and 1E). Buss 142 is connected by line 142-1 (FIG. 1E) and a NAND gate 143 to the inputs of two AND gates 144 and 145, the outputs of which are connected by line 62-3 to the data buss 62. At this time gate 144 is only partially gated, but gate 145 is fully enabled by the presence of the store signal on line 114-1, so that signals from the output of the A register 80 are transmitted through gate 145 to the data buss 62, and from there through line 62-1 (FIGS. 1B and 1D) to the input gate 118 for the storage register 110. Thus, each time a signal appears on the output line 130-1 of gate 130, a bit of information in the A Register 80 is shifted serially out of the A Register, and serially into the storage register 110. This shifting sequence continues until the counter 133 has counted 32 pulses on the output line of gate 130. These are the number of data shifting pulses necessary to transfer completely the 32 bits in A Register 80 to storage register 110.

During the shifting of data from A Register 80 to the storage register 110, the data pulses, which are received by data buss 62 from the result buss 142, are also applied by lines 60-1 (FIG. 1A) and 60-2 to the inputs of gates 63 and 64; but these two gates are not enabled at this time, so that the contents of display register 71, and the display 72, are not changed. Also, there is no signal on routing line 68, so that gate 33, and hence gate 85 (FIG. 1B) are not enabled; and the store flip flop 111 (FIG. 1D) is set so that there is no signal on its output 111-1 (FIGS. 1B and 1D). Consequently gate 104 is also disabled so that data does not reenter Register 80 during its transfer to Register 110.

After the counter 133 has completed its count, a signal appears on its output line 133-1, thereby enabling, together with the storage signal appearing on line 114-1, an AND gate 147 (FIG. 1D), thus producing on its output line 147-1, a signal which resets the store flip flop 111, thereby removing the store signals from lines 112 and 114-1. This completes the transfer sequence of data from A Register 80 to the storage register 110.

While data may be stored directly from the A Register 80 to the storage register 110, it cannot be transferred directly from Register 81 or 82 to register 110. Thus, if the data to be stored is in the BCD Register 81 or in the X Register 82, rather than in the A Register 80, it must first be transferred from the register 81 or 82 to the A Register 80, in a manner which will be described hereinafter.

Instead of storing data in the register 110 after it has been entered into either the A Register 80, the BCD Register 81, or the X Register 82, it may be desirable to convert the data from one base to another, and to display the converted data in the display 72. If the data previously entered was binary, octal or hexidecimal data, it will be present in the pure binary form in the A Register 80. To convert the data from one form to one of the other of these three forms, and to display it in its new form, it is necessary only to ring gate the bits in the A Register 80 through the display register 71, while utilizing the shift counter 40 to regroup the bits in the display register 71.

For example, assuming that input data to the radix two, or pure binary, has been entered in A Register 80 and displayed on display 72, and that it is desired to convert the data to octal form, or to the base eight, and to display the data in its new form, the operator merely pushes the radix key for base eight on the keyboard 20. This momentarily energizes clock E for the second time, thus producing a clock pulse E, which resets the radix register 22, before the new radix signal on line 21-2 sets the octal register 23. At this time, since the input data had not been stored in register 110, a signal exists on the output line 120-2 of memory 120 (FIG. 1D), and is applied to the input of an AND gate 150 (FIG. 1C), which is in its set state as the result of the clock signal D, which was applied to its other input at the time the data was entered in the data register 52. A signal thus exists on the output line 152-1 of gate 152, and partially enables an AND gate 154, which controls a convert flip flop 155. Since the clock signal D did not exist the first time clock E was present, the gate 154 was not enabled when the first radix key was pushed. However, when the new radix key is pushed the momentary appearance of the clock signal E at gate 154 for the second time, fully enables this gate and sets the convert flip flop, thus producing a signal on the output line 155-1 of this flip flop.

The signal on the output line 155-1 (FIG. 1C) of flip flop 155 is applied simultaneously to AND gates 160, 161, 162, 163, 164, 165, 166, 167 and 168 (FIG. 1C). Address line 31A is also connected to the inputs of gates 160, 163 and 166; line 31B is connected to the inputs of gates 161, 164 and 167; line 31X is connected to the inputs of gates 162, 165 and 168; the output line 87-1 of memory 87 (FIG. 1B) is connected to the inputs of gates 160, 161 and 162; memory output line 93-1 is connected to gates 163, 164 and 165; and memory output line 98-1 is connected to the inputs of gates 166, 167 and 168.

With register 23 now set, the presettable shift counter 40 is set by line 23-1 for a three bit shift, and the decoder 31 energizes line 31A. Since the memory 87 has not as yet been reset, its output line 87-1 is enabled also, so that with the setting of the convert flip flop 155, the gate 160 (FIG. 1C) is enabled, thus producing a signal on its output line 160-1. This signal is applied to an OR gate 183 (FIG. 1E), which together with a no storage signal on line 111-1, enables an AND gate 184. This sets a flip flop 185 to produce a signal on its output line 185-1. This signal, which indicates that a conversion sequence is unnecessary, or has been completed, is applied by line 185-1 to the reset terminal of the convert flip flop, and thereby resets the latter, removing the signal from line 155-1. The conversion complete signal on line 185-1 is also applied to one of the inputs of gate 64 (FIG. 1A), and to the inputs of two further AND gates 187 and 188 (FIG. 1E). The other input of gate 187 is connected to clock A, so that gate 187 is sequentially enabled at this time. The output line 187-1 of gate 187 is connected to line 132 (FIG. 1E) to energize the counter 133 to ring shift the data in the A Register 80 in a manner somewhat similar to that described above in connection with the transfer of data from A Register 80 to storage register 110. During this ring shift operation, however, the gate 134 (FIG. 1A) is sequentially enabled by the output signal existing on line 185-1 of the now set flip flop 185, and by the intermittent signals applied from lines 187-1 (FIG. 1E), 132, and 132-2 (FIGS. 1E and 1A) to gate 134. Also at this time the store flip flop 111 is not set, so that a signal appears on its output line 111-1 (FIGS. 1D and 1B) and partially enables gate 104 (FIG. 1B). The address signal on line 31A also partially enables gate 104 and gate 137 (FIG. 1E).

Each time a signal appears on line 187-1, gate 137 (FIG. 1E) is enabled and provides on line 137-1 (FIGS. 1E and 1D) a shift signal which shifts bits of information serially out of A Register 80 through gate 140 and line 141 to the result buss 142. From buss 142, these bits or signals are applied through line 142-1 (FIG. 1E) and NAND gate 143 to one input of an AND gate 144, the other input of which is now enabled by the signal appearing on output line 188-1 of gate 188 (FIG. 1C). The output of gate 144 is connected by the line 62-3 to data buss 62 so that data signals shifted out of A Register 80 now reenter the A Register through line 62-1 (FIG. 1B) and gate 104, and are also applied through line 60-1 and gate 64 to the preset register 70.

The signals appearing on line 187-1, and thus 132-2, sequentially enable gate 134, so that shift counter 40 produces, after the first three pulses on lines 132 and 132-2, a shift complete signal on line 42 (FIG. 1A), thus enabling the four pulse counter 73, and through a NAND gate 42-3 (FIG. 1E) producing a disabling signal which interrupts or stops both the shifting gate 137 and the pulse counter 133 until the preset register 70 has been shifted four times to advance its data into the display register 71. The counter 40 is then reset, and the data in register 71 is then displayed, by the appearance of a counter complete signal on lines 78, 79, 79-1 (FIG. 1A) and 46 in a manner similar to that described above. During the period that the preset and display registers were shifted four places, the shifting of A Register 80 and the counting of counter 133 were suspended, so that after the shift counter is reset for a three bit count, the next successive three bits or signals in A Register 80 are shifted out to the result buss 142, reentered through gate 104 to the A Register, and shifted as a four bit group through the preset to the display register 71 as described above.

After the last bit has been shifted out, and back into, the A Register, counter 133 finally counts out and produces a convert complete signal on line 133-1, thereby resetting flip flop 185, and removing the signal from line 185-1. This completes the conversion of the data from binary to octal form. It will be understood that essentially the same sequence occurs for converting from octal to hexidecimal or to binary, and vice versa.

FIG. 3 is illustrative of the relationship between binary, octal and hexidecimal data, which is stored, for example in A Register 80, in pure binary form and with the most significant digit at the left end. Assuming the data represented by the binary line in FIG. 3 were to be converted to Octal, it would be shifted serially, starting with its least significant digit, out of and back into the A Register, during which time each successive group of three bits shifted out of register A would have a zero added to its left end by the preset register before entering register 71. The display would then illustrate the binary representation of FIG. 3 as 131463, or the octal equivalent of the binary data of FIG. 3. If the conversion were to be to hexidecimal, each successive group of four bits shifted out of the A Register would be entered in the display register (without addition of any bits by the preset register) and displayed to the hexidecimal base.

If it is desired to convert data from one of the pure radix forms of binary, octal or hexidecimal to either binary coded decimal (BCD) or mixed radix (X) form, or vice versa, or to convert from BCD to mixed radix, or vice versa, then it is necessary to convert the data before it can be displayed at the display 72. In either case, the conversion takes place automatically upon the operation of the new or second radix key on the keyboard 20.

For example. assuming that input data to the base octal is already in the A Register 80, and is to be converted to BCD form, the operator pushes the BCD radix selecting key on keyboard 20. This once again (for the second time) energizes clock E, producing a single output pulse E, which, as noted above, sets the convert flip flop 155, and resets the radix registers 22 to 26 before the new radix signal appears on line 21-4 to set the radix register 25. Register 25 then produces a signal on line 25-1, and therefore on line 31B. However, there being no new input data in the data register 52, the routing signal does not appear on line 68; and the gate 34 is not enabled.

Referring again to FIG. 1C, each of twelve NAND gates 170, 171, 172, 173, 174, 175, 176, 177, 178, 179, 180 and 181, has one of its two inputs connected to the output of clock A. The other input of each of these gates is connected as follows:

170 and 171 to the output of gate 161, 172 and 173 to the output of gate 162, 174 and 175 to the output of gate 163, 176 and 177 to the output of gate 165, 178 and 179 to the output of gate 166, and 180 and 181 to the output of gate 167. The outputs of the gates 170 and 172 are connected by line 172-1 to a count down terminal on the A Register 80. The outputs of the gates 174 and 176 are connected by line 176-1 to a count down terminal on the BCD register 81; and the outputs of the gates 178 and 180 are connected by line 180-1 to a count down terminal on X register 82. The outputs of the gates 171 and 181 are connected by a line 181-1 to a count up terminal on the BCD register 81; the outputs of the gates 173 and 177 are connected by a line 177-1 to a count up terminal on the X register; and the outputs of gates 175 and 179 are connected by a line 179-1 to a count up terminal on the A Register.

Each time a signal is applied to the count up terminal of the register 80, its contents is increased by a binary one; and each time a signal is applied to its count down terminal, the contents of the register is reduced by a binary one. Each time a signal is applied to the count up terminal of the BCD register 81 its contents is increased by a binary coded decimal (BCD) one; and conversely, when a signal is applied to its count down terminal, the contents of this register is reduced by a binary coded decimal one. The count up and count down terminals of the X register operate in a similar manner to increase or decrease the contents of this register by one increment each time a signal appears at its count up or count down terminal, respectively.

With data now in the A Register, and with a signal now appearing on line 31B as the result of the newly selected decimal radix, and on line 87-1 as a result of the set memory 87, and on line 155-1 as a result of the setting of the convert flip-flop 155, the gate 161 (FIG. 1C) is enabled, thus gating the gates 170 and 171 with each appearance of the clock signal A. The BCD Register 81, which is wired so that in its start or reset position it is in a minus one state, and the A Register 80, are thus provided, respectively, with count up signals on line 181-1 and with count down signals on line 172-1, each time a clock A signal is applied to the input of the gates 170 and 171. Consequently, the A Register 80 is counted in a downward direction, while the BCD register begins to count up until the register reaches its reset state, which, as in the case of the BCD and the X Registers, corresponds to a minus one state, or one past zero.

For example, assuming that register 80 contains in binary form the equivalent of the decimal number 59, then 59 clock signals must appear on line 172-1 before register 80 reaches its reset condition. During this time, the same 59 clock signals are applied by line 181-1 to the count up terminal of the BCD register, so that its contents is increased from zero (or reset) to the binary coded decimal equivalent of the decimal number 59, as represented by the fifty-nine signals that it took to empty the A register. The signal from clock A will continue to be applied to lines 172-1 and 181-1 until the A register 80 is emptied, at which time the BCD register will contain the binary coded decimal equivalent of the decimal number formerly represented in pure binary form in register 80.

When this condition is reached, a borrow signal appears on the output line conditionis reached, a borrow signal appears on the output line 80-2 of the A Register 80, and is applied to the input of the OR gate 183 (FIG. 1E), the output of which then sets the flip-flop 185 to indicate that the conversion of the data from a binary radix in Register 80 to a decimal radix in Register 81 is complete. Flip-flop 185 then produces on its output line 185-1 a conversion complete, or display signal, which resets the flip-flop 155 to remove the signal from line 155-1, and which, as noted above, applies a signal to one of the inputs of the gate 64 (FIG. 1A) leading to the input of the present register 70. This same signal also partially enables the gates 187 and 188 (FIG. 1E), which thereafter are sequentially enabled by the clocks signals A and B. The output from gate 187 on line 132 thus supplies the shift signals to one input to gate 136. The other input 31B to gate 136 is enabled at this time as the result of having selected the BCD redix. Gate 136 output is then used to ring shift the BCD Register 81 in a manner similar to that noted above with respect to the ring shifting of the A Register. The data, which has been converted from the A Register 80 to the BCD Register 81, is thus displayed at the display 72 as it passes out of the BCD Register from the result buss 182 to the data buss 62, and from the latter through line 62-1 (FIG. 1B) and gate 91 back into the BCD Register 81, and through line 60-1 (FIG. 1A) and gate 64 to the preset 70. When the ring shifting of the BCD Register 81 is complete, the counter 133 finally counts out, and produces a conversion complete signal on line 133-1 to reset the flip-flops 152 and 185.

In a similar manner, to convert any data in the A Register 80 to a mixed radix form, as represented by the radix value X, the X radix key on the keyboard 20 is pushed. The new radix signal will set the convert flip-flop 155, and will produce a signal on line 31X, thus providing two inputs for the gate 162 (FIG. 1C). Since the input data is already in the A Register, the memory 87 is set, so that its signal exits on line 87-1, which completes the enabling signals for gate 162. When gate 162 is enabled, gates 172 and 173 are sequentially enabled with the appearance of clock signal A, thereby producing output signals on lines 172-1 and 177-1 to cause the contents of the A Register 80 and the X Register 82 to be counted downwardly and upwardly, respectively, until the borrow signal appears on line 80-2 at the output of the A Register. This signal, as noted above, gates the OR gate 183 to set the convert complete flip-flop 185, thereby to effect the periodic gating of the gates 187 and 188. During this ring shift operation, however, the address X signal appears on the line 31X partially to enable the gate 135 (FIG. 1E), so that the ring shift signals that appear on line 132 cause shifting signals to appear on line 135-1 (FIGS. 1E and 1B). These signals cause the data, which has been converted to the X radix and now present in the X Register 82, to be shifted serially out of the latter to the preset 70, and back into the X Register in a manner that will be apparent from the above description. At the completion of ring shift operation, the counter 133 again counts out to produce on line 133-1 the conversion complete signal, which again resets the flip-flops 152 and 185.

From the foregoing it will be apparent that gates 163, 165, 166 and 167 (FIG. 1C) will be enabled selectively upon the operation of the proper radix selecting key on the keyboard 20 to convert, respectively, data in the BCD Register to a binary form in the A Register, data in the BCD Register to an undefined or X radix in the X Register, data in the X Register to a binary form in the A Register, and data in the X Register to a decimal radix in the BCD Register. Each such conversion sequence, will cause the converted data to be displayed at the display 72 upon the ring shift portion of the conversion sequence.

As previously noted, input data must be stored in the storage register 110 if an arithmetic operation is to be performed thereon. If the input data is in pure binary radix form — i.e., either binary, octal or hexadecimal — it may be transferred directly from the A Register to the storage register 110. If, however, the data forming the first operand is in either the BCD Register 81, or the X Register 82, it must automatically be converted to the binary radix in the A Register before being entered into the storage register 110.

If data that is to be stored in the register 110 is in the BCD Register 81, for example, at the time that the storage button on the keyboard 20 is pressed, the setting of the store flip-flop 111 removes its enabling signal on line 111-1 from the gate 184 (FIG. 1E), and establishes a storage signal on line 112. This signal, together with the signals on the memory line 93-1 enables the gate 115 (FIG. 1D), producing on its output line 115-1 a signal which is applied to the output line 163-1 of the gate 163 controlling the sequence for converting or shifting data from the BCD Register 81 to the A Register 80. This signal on line 163-1 (FIG. 1C) enables gates 174 and 175 with each appearance of a clock signal A, thereby producing on line 176-1 and 179-1, pulses which cause the data in the BCD register to be counted downwardly at the same time that corresponding clock signals are counted upwardly in the A Register 80. When the BCD register has been counted fully downwardly to its minus one condition, a borrow signal appears on its output line 81-2 to enable the OR gate 183 (FIG. 1E). This time, however, the gate 184 is not enabled, because there is no signal on its other input line 111-1; and consequently the convert complete flip-flop 185 is not set at this time.

As shown more clearly in FIG. 1B, three OR gates 190, 191, 192, and three AND gates 194, 195 and 196 are provided for controlling the memories 87, 93 and 98, so that whenever data is converted or transferred from one of the registers 80, 81 or 82 to another of these registers, the memory of the register in which data is entered or counted up, is set at the conclusion of the transfer. For example, the signal lines 81-2 and 82-2 are connected to the input of the OR 190, so that either signal will enable gate 190 and produce an output signal which partially enables the AND gate 194. Line 179-1 is connected to the other input of the gate 194, so that when the last count has occurred, for example, in the A Register from the BCD Register, gate 194 is enabled, and produces a signal and gates the NOR gate 86 to set the memory 87, and thereby reset the memory 93. Similarly, the carry signal lines 80-2 and 82-2 are connected to the input of the OR gate 191, the output of which enables the gate 195, when during a conversion sequence the last count signal produces an A Register borrow signal or conversion complete. This means that the BCD Register now contains the data; and to indicate this the gate 92 will be enabled to set the memory 93. Signal lines 80-2 and 81-2 are connected to the input of the OR gate 192 in order to enable the gate 196, when the last bit of data is entered, or counted up, in the X Register from either the A Register 80 or the BCD Register 81. At such time the NOR gate 97 is enabled to set the memory 98.

In the case of the example under consideration, where data is being converted from the BCD memory to the A memory 80 before being transmitted to the storage register 110, the setting of the memory 87 at the conclusion of transfer of data into the A Register removes the signal from line 93-1, thereby disabling the gate 115 (FIG. 1D), and simultaneously producing on line 87-1 a signal which enables the gate 114 (FIG. 1D). This initiates the store cycle, which effects the transfer of the data in the A Register to the storage register 110 in a manner that will be apparent from the above description.

If it is desired to store data which has been put in the X Register, the storage key on the keyboard 20 is pushed, thereby setting the store flip-flop 111, and thereby enabling the gate 116 (FIG. 1D). The output of gate 116 is connected by line 116-1 to the output one 166-1 (FIG. 1C) of the gate 166, thereby enabling the gates 178 and 179 with each appearance of a clock signal A. Counting signals thus appear on lines 180-1 and 179-1. This causes the data in the X Register 82 to be counted downwardly while corresponding data is counted upwardly into the A Register until the borrow signal appears on line 82-2 at the output of the X Register, and at the input of the OR gate 190. With the last count signal, therefore, memory 87 is set, as noted above, thereby resetting the X memory 98 and enabling the gate 114 (FIG. 1D) to commence the storage cycle.

From the foregoing it will be apparent that this invention provides apparatus which is capable of converting input data from one radix or base to binary, octal, BCD, hexadecimal, or any other base, and automatically to display the results. The apparatus is further capable of performing multiplication, division, addition and subtraction with a second operand or number, which has many of the above-mentioned bases provided, of course, that the last-named operand is converted, if necessary, to the A Register 80 before being entered into the arithmetic unit 124.

When one operand has been stored in register 110, and a second has been entered for purposes of an arithmetic operation, the second operand must be entered in the A Register 80 before the arithmetic operation can take place. If the second operand is entered in BCD or X radix form, it must therefore be converted and transferred to the A Register 80 in the manner described above. After the first and second operands are in the registers 110 and 80, respectively, either the add, subtract, multiply or divide key on keyboard 20 is depressed, thus providing a command signal on one of the lines 125-1, 125-2, 125-3, or 125-4 (FIG. 1D). The arithmetic unit 124 is a standard serial arithmetic circuit into which data is serially shifted simultaneously, and least significant bit first, from the A Register 80 and the storage register 110, whenever one of the arithmetic operation buttons is depressed. Data from A Register 80 enters from the result buss 142 through input line 124-1; and data from register 110 enters unit 124 from line 110-1.

All results are serially shifted out of the unit 124 on line 62-4 to the data buss 62. However, depending upon which arithmetic operation was selected, unit 124 determines whether its output (results) should be entered in A Register 80, or the storage register 110. If either the addition or subtraction key was pushed, output signals appear on lines 124-2 and 124-3, which are connected, respectively, to lines 137-1 and 31A, thereby to enable the results or output data of unit 124 to be entered in A Register 80, and to be displayed. For multiplication or division, additional signals appear on lines 124-4 and 124-5, which are connected to lines 131-1 and 113-1, respectively, thereby enabling the storage register 110. In the case of multiplication, the A Register 80 is used for the least significant bits, and register 110 for the most significant bits. In the case of division, A Register 80 is used for the quotient, and 110 for the remainder.

The arithmetic unit 124 (FIG. 1D) also has the capability of storing constants for use in the calculations. The constants are entered into the arithmetic unit storage from the A Register 80 via the result buss, 142 and line 350 upon a command signal from the keyboard. Obviously, several numbers can be operated on by storing the results of a previous operation by unit 124, entering a new number, and performing a new operation. The results of any such operation are automatically displayed by display 72 upon being entered in A Register 80. Moreover, such results may be converted to a different radix, merely by pushing one of the radix buttons on keyboard 20 as noted above.

FIG. 4 is intended merely to show the relationship between the clock signals and the appearance of other signals indicating the commencement of a particular sequence. It is not intended to show the exact relationship of these signals at all times. Clock A, for example, is normally used to initiate a sequence, and clock B is normally used to store the results. The clock E is pulsed each time a radix key is depressed; and it produces a signal on the radix signal line RS. When a data key is operated, signals appear on lines 51-1 to 51-4 (line 51 in FIG. 4) and also energize clock D. When an arithmetic key is operated (line 125 in FIG. 4), the clock F is pulsed.

While the above-noted conversion apparatus has been described as being particularly useful in conjunction with a computer, it will be apparent that it may be used, for example, for instructional purposes without the arithmetic unit, and for calculating purposes with the arithmetic unit.

Having thus described our invention, what we claim is:

1. Numerical base translator apparatus, comprising
means for entering in bit form numerical data having, selectively, any one of at least three a plurality of different radices,
display means connected to said entering means for automatically displaying the entered data in a numerical form based upon said one radix,
said entering means including means for selecting any other of the remainder of said plurality of radices after the first-named data has been entered, and
conversion means responsive to the selection of said other radix automatically to convert the previously entered data to equivalent data based on said other radix,
said conversion means including means for changing said display means to cause said display means to display said equivalent data in numerical form based upon said other radix, rather than displaying the data based upon said one radix.

2. Apparatus as defined in claim 1,
said entering means being operable selectively to enter data digits in a plurality of different bit codes depending upon the radix of the digits to be entered, and including one, three and four-bit codes for representing a digit by one, three and four data bits, respectively,
said display means including a first register for receiving in bit code form each successive data digit that is entered,
means for grouping each coded digit in said first register in four-bit groups, with the data bits in each group corresponding in number to the number of data bits required to represent a digit in the selected code, and representing the binary equivalent of the corresponding data digit, and
said display means further including means for displaying the data digit represented by the data bits in each of said groups.

3. Numerical base translator apparatus, comprising
means for entering in bit form numerical data having one of a plurality of different radices,
means for automatically displaying the entered data in numerical form based upon said one radix,
said entering means including means for selecting another of said plurality of radices after the first-named data has been entered,
conversion means responsive to the selection of said other radix automatically to convert the previously entered data to equivalent data based on said other radix, and to cause said display means to display said equivalent data in numerical form based upon said other radix,
said entering means being operable selectively to enter data digits in a plurality of different bit codes depending upon the radix of the digits to be entered, and including one, three and four-bit codes for representing a digit by one, three and four data bits, respectively,
said display means including a first register for receiving in bit code form each successive data digit that is entered,
means for grouping each coded digit in said first register in four-bit groups, with the data bits in each group corresponding in number to the number of data bits required to represent a digit in the selected code, and representing the binary equivalent of the corresponding data digit,
said display means further including means for displaying the data digit represented by the data bits in each of said groups,
a second register for receiving substantially simultaneously with said first register the data bits representing digits having any of the three radix forms of binary, octal and hexadecimal, said binary, octal and hexadecimal digits being entered in one, three and four-bit codes, respectively, and
means operative, after entry into said first and second registers of data having one of said three forms, and upon the selection of a new radix corresponding to another of said three forms, to cause said grouping means to regroup each coded digit in said first register so that the number of data bits in each of said four-bit groups equals the number of data bits required to represent a digit in the bit code represented by the newly selected radix.

4. Apparatus as defined in claim 3, including
a third register for receiving substantially simultaneously with said first register the data bits representing digits having the decimal radix form, and entered in a four-bit code different from the code for data entered in hexadecimal form,
means operative after the entry of decimal data into said first and third registers, and upon the selection of a new radix corresponding to one of said three forms associated with said second register, to cause the data in said third register to be converted into equivalent data in said second register by counting down said third register until all data is removed therefrom, while simultaneously counting up said second register, thereby to enter in said second register the binary equivalent of the data previously contained in said third register, and
means operative after the conversion of data from said third to said second register to cause said grouping means to regroup the coded digits in said first register in correspondence with the bit code of the newly selected one of said three radix forms.

5. Apparatus as defined in claim 4, including
means operative after the entry of data into said first and second registers, and upon the selection of a new radix corresponding to said different four-bit code, to cause the data in said second register to be converted to equivalent data in said third register by counting down said second register until all data is removed therefrom, while simultaneously counting up said third register, thereby to enter in said third register in said different four-bit code the equivalent of the data previously contained in said second register, and
means operative after the conversion of data from said second register to said third register to cause said grouping means to regroup the data bits in said first register in correspondence with said different four-bit code.

6. Apparatus as defined in claim 5, including
a storage register,
storage means operable to effect the transfer of data from said second and third registers to said storage register, including
means for transferring data directly from said second register to said storage register, and
means operative, when said storage means is actuated to transfer data from said third register to said storage register, successively to convert data in said third register to equivalent data in said second register, and then to transfer the last-named data from said second register to said storage register.

7. Numerical base translator apparatus, comprising
means for entering digits having any one of a plurality of different radices, and selectively in one of a plurality of different bit codes, depending upon the radix of the digit to be entered, and each bit code requiring a predetermined number of data bits to represent a digit,
a display register for receiving successive input digits in equi-bit groups, with the data bits in each group representing the binary equivalent of the associated input digit,
display means connected to said display register and operative to display in alpha-numerical form the digit represented by the data bits of each of said groups,
a plurality of holding registers,
means for routing the data bits representing each input digit substantially simultaneously to said display register and to one of said holding registers, and
conversion means operable to convert the data bits in said display register and said one holding register to equivalent data bits based on another of said radices,
said routing means including grouping means responsive to the operation of said conversion means to regroup the data bits in said display register so that the data bits in each of said groups represent the binary equivalent of a digit based on said other radix.

8. Apparatus as defined in claim 7,
said entering means including radix selecting means operable before the entry of a digit to select the radix for the digit to be entered, and operable after the entry of a digit to select a new radix, and
means operative automatically to operate said conversion means, when said selecting means is operated to select a new radix while data is held in one of said registers.

9. Apparatus as defined in claim 8,
said holding registers comprising a binary register for receiving the data bits representing any input digits based on the three pure binary radices two, eight and sixteen, respectively, and
said conversion means including means for ring gating data out of, and back into, said binary register during the conversion of data representing digits based on one of said three binary radices to equivalent data representative of digits based on another of said three radices.

10. Apparatus as defined in claim 9,
said holding registers comprising at least two further registers for receiving, respectively, data bits representing input digits based on two further radices, and
said conversion means further including means for converting data between said two further registers, during the conversion of data based on one of said two further radices, to data based on the other of said two further radices, and vice versa, and for converting data between said binary register and one of said two further registers during the conversion of data based on one of said three binary radices to data based on one of said two further radices, and vice versa.

11. Apparatus as defined in claim 10, including
a storage register,
storage means operable to transfer data from said holding registers to said storage register, including
means for transferring data directly from said binary register to said storage register upon operation of said storage means, and
means operative, when the data to be stored is in either one of said two further registers, automatically to actuate said conversion means to convert the data from the last-named register to equivalent data in said binary register, and then to transfer the last-named data from the binary register to said storage register, upon operation of said storage means.

12. Apparatus as defined in claim 11, including means preventing operation of said grouping means during transfer of data from said binary register to said storage register.

13. Apparatus as defined in claim 10, said converting means including means for counting down to a reset state the holding register containing the data that is being converted from an old to a new radix, while simultaneously counting up on the holding register that is to hold the equivalent data having the newly selected radix thereby to remove data from the holding register that is counted down, and to enter the equivalent data in the holding register that is counted up.

14. Apparatus as defined in claim 13, including means operative after the conversion of data to the register that is counted up, to ring gate data out of, and back into, the last-named register, and said grouping means being operative during the ring gating of data in any of said holding registers to regroup the data bits in said display register in correspondence with the radix of the ring-gated data.

15. A computer, comprising a data register having a parallel input and a serial output, means for entering one by one in said data register, and in bit form, digits having any one of a plurality of different radices, and including digits in binary, octal, hexidecimal, and substantially decimal forms, respectively, means operable, before the entry of data into said register, for selecting the radix of the digit to be entered by said entering means, and operable after the entry of data to select a new radix, means for detecting the selected radix, a display register, a plurality of holding registers having serial inputs, means operative automatically, after the selection of the first-named radix and the entry of a digit into said data register, to transfer the last-named digit serially, and most significant bit first, out of said data register and simultaneously to said display register and to one of said holding registers, decoder means responsive to said detecting means to route the output of said data register serially to a first one of said holding registers, when the input digit is in any one of the three forms of binary, octal and hexidecimal, respectively, and to route said output serially to a second one of said holding registers, when the input digit is in decimal form, conversion means operative after the entry of data into said display register and into any one of said holding registers, and upon the operation of said selecting means to select said new radix, to convert the data in the two last-named registers into the equivalent of data based on said new radix, and display means connected to said display register for displaying in numerical form, and to the first-named radix, the data entered into said display register by said transfer means, and operative upon the conversion of the data in said display register, to display the last-named data in numerical form, and to said newly selected radix.

16. A computer as defined in claim 15, wherein said entering means is operable to enter digits having a radix form different from said binary, octal, hexidecimal and decimal forms, and said decoder means includes means operative in response to the entry of digits based upon said different radix form to route the output of said data register to a third one of said holding registers.

17. A computer as defined in claim 15, wherein said entering means is operative to enter binary data in a one data bit code, octal data in a three data bit code, and hexadecimal and decimal data in a four data bit code, a multi-bit preset register capable of storing at least four bits has a serial input operatively connected to the output of said data register, and an output connected to the input of said display register, and said transfer means includes first counter means operative intermittently to shift each digit in its code form from said data register to said preset register, and second counter means operative between operations of said first counter means to shift said preset register a number of times equivalent to the maximum number of bits capable of being held by said preset register, thereby to shift each successive digit in its code form into said display register in equi-bit groups, with the number of data bits in each of said groups corresponding to the number of data bits in the corresponding coded digit as shifted into said preset register.

18. A computer as defined in claim 17, wherein said first counter means comprises a settable shift counter operated each time a digit is entered, and settable by said radix detecting means selectively for one, three and four shift pulses corresponding, respectively, to data entered in one, three and four bit codes, said second counter means comprises a four pulse counter having an output connected to said preset and display registers, and means connects the output of said settable shift counter to said data register to shift data bits therefrom upon each operation of said settable shift counter, and to initiate the operation of said four pulse counter each time said settable counter counts out.

19. Numerical base translator apparatus, comprising a pair of registers, means for selectively entering in bit form in one of said registers numerical data having a first radix, means for selectively entering in bit form in the other of said registers numerical data having a second radix, means operable when said other register is empty, for converting numerical data held in said one register to equivalent numerical data by counting down the contents of said one register to return it to its reset state, while simultaneously counting up said other register to enter said equivalent data therein, and means operable, when said one register is empty, for converting numerical data held in said other register to equivalent numerical data by counting down the contents of said other register to return it to its reset state, while simultaneously counting up said one register to enter the last-named data therein.

20. Numerical base translator apparatus as defined in claim 19, including a third register, means for selectively entering in bit form in said third register numerical data having a third radix, and means operable, when any one of said three registers contains data, and either of the two remaining registers is empty, to convert the data in said one of the three registers to equivalent data in the empty register by simultaneously counting down said one of the three registers until it is reset, while simultaneously counting up said empty register to enter the last-named equivalent data therein.

* * * * *